US012585324B2

(12) United States Patent
Fujiki

(10) Patent No.: US 12,585,324 B2
(45) Date of Patent: Mar. 24, 2026

(54) PROCESSOR, IMAGE PROCESSING DEVICE, GLASSES-TYPE INFORMATION DISPLAY DEVICE, IMAGE PROCESSING METHOD, AND IMAGE PROCESSING PROGRAM

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 18/463,406

(22) Filed: Sep. 8, 2023

(65) Prior Publication Data

US 2024/0087489 A1 Mar. 14, 2024

(30) Foreign Application Priority Data

Sep. 12, 2022 (JP) ................................. 2022-144848

(51) Int. Cl.
| | |
|---|---|
| *G06F 3/01* | (2006.01) |
| *G02B 27/01* | (2006.01) |
| *G06F 3/04815* | (2022.01) |
| *G06T 19/00* | (2011.01) |
| *G09G 3/00* | (2006.01) |

(52) U.S. Cl.
CPC ............ *G06F 3/011* (2013.01); *G02B 27/017* (2013.01); *G02B 27/0172* (2013.01); *G06F 3/04815* (2013.01); *G06T 19/006* (2013.01); *G09G 3/002* (2013.01); *G02B 2027/0138* (2013.01); *G02B 2027/014* (2013.01); *G02B 2027/0178* (2013.01); *G06F 2203/012* (2013.01); *G06T 2200/04* (2013.01); *G09G 2340/0464* (2013.01)

(58) Field of Classification Search
None
See application file for complete search history.

(56) References Cited

U.S. PATENT DOCUMENTS

| | | | |
|---|---|---|---|
| 2017/0206710 A1 | 7/2017 | Touma et al. | |
| 2018/0356882 A1* | 12/2018 | Kaneko | ................... G06F 3/012 |
| 2019/0114899 A1* | 4/2019 | Kitada | ................... G08G 1/166 |

(Continued)

FOREIGN PATENT DOCUMENTS

| | | |
|---|---|---|
| JP | 2017-102242 A | 6/2017 |
| JP | 2020-98568 A | 6/2020 |

(Continued)

OTHER PUBLICATIONS

Author: Thriving Octopus; Title: Shopping with Augmented Reality; pp. 21; Date: May 10, 2017; Source: https://www.youtube.com/watch?v=UQcJSZPpNhA (Year: 2017).*

(Continued)

*Primary Examiner* — Jwalant Amin
(74) *Attorney, Agent, or Firm* — Birch, Stewart, Kolasch & Birch, LLP

(57) ABSTRACT

A processor is configured to display a first display image that displays information related to an object existing in a real space and a second display image on a transmissive display device, change a display position of the second display image based on a change of a relative position between the display device and the object, and perform a control to make a change amount of a display position of the first display image smaller than a change amount of the display position of the second display image.

12 Claims, 14 Drawing Sheets

(56) References Cited

U.S. PATENT DOCUMENTS

| | | | | |
|---|---|---|---|---|
| 2020/0202634 | A1* | 6/2020 | Faulkner | G06T 19/006 |
| 2020/0388056 | A1* | 12/2020 | Glazberg | G06F 21/629 |
| 2021/0397252 | A1 | 12/2021 | Nakade et al. | |
| 2022/0035510 | A1* | 2/2022 | Behzadi | G06F 3/0484 |
| 2022/0254109 | A1* | 8/2022 | Ohashi | G06T 7/70 |

FOREIGN PATENT DOCUMENTS

| | | | |
|---|---|---|---|
| JP | 2020-142792 | A | 9/2020 |
| JP | 2022-119826 | A | 8/2022 |

OTHER PUBLICATIONS

Extended European Search Report for European Application No. 23196531.0, dated Feb. 6, 2024.
Hyper Ar, "Grocery store AR + maps—find everything on your shopping list!," YouTube, Nov. 23, 2021, XP93123184, URL: <https://www.youtube.com/watch?v=hbubGuYqBil>.
Thriving Octopus, "Shopping with Augmented Reality," YouTube, May 10, 2017, XP93123173, URL: <https://www.youtube.com/watch?v=UQcJSZPpNhA>.
Japanese Office Action for corresponding Japanese Application No. 2022-144848, dated Dec. 16, 2025, with English translation.

* cited by examiner

70

72

10

U

81

82

DESTINATION

80

86

81

82

DESTINATION

87

71

74

PROCESSOR, IMAGE PROCESSING DEVICE, GLASSES-TYPE INFORMATION DISPLAY DEVICE, IMAGE PROCESSING METHOD, AND IMAGE PROCESSING PROGRAM

CROSS REFERENCE TO RELATED APPLICATIONS

This application claims priority from Japanese Application No. 2022-144848, filed on Sep. 12, 2022, the entire disclosure of which is incorporated herein by reference.

BACKGROUND

1. Technical Field

The present disclosure relates to a processor, an image processing device, a glasses-type information display device, an image processing method, and a non-transitory storage medium storing an image processing program.

2. Related Art

A transmissive display device such as an augmented reality (AR) device that displays a state in which images are superimposed in a real space is known in the related art.

In a brain of a user who uses the transmissive display device, a real image in which the real space is visually recognized and a displayed image in which a display image is visually recognized are combined, so that the user can visually recognize a state in which the displayed image overlaps the real image. A technique of performing navigation to a user using the display image is known (for example, refer to JP2017-102242A).

SUMMARY

However, in the technique of the related art, the position of the displayed display image changes according to the movement of the user or the like. As a result, an afterimage of the display image is generated, which may make it difficult for the user to visually recognize the display image in some cases.

The present disclosure has been made in view of the above circumstances, and an object of the present disclosure is to provide a processor, an image processing device, a glasses-type information display device, an image processing method, and a non-transitory storage medium storing an image processing program capable of reducing the afterimage and making it easier to visually recognize the display image for performing navigation with respect to an object.

In order to achieve the above object, a processor of a first aspect of the present disclosure is configured to display a first display image that displays information related to an object existing in a real space and a second display image on a transmissive display device, change a display position of the second display image based on a change of a relative position between the display device and the object, and perform a control to make a change amount of a display position of the first display image smaller than a change amount of the display position of the second display image.

According to a processor of a second aspect of the present disclosure, in the processor of the first aspect, the processor is configured to perform a control to display the second display image to follow the change of the relative position.

According to a processor of a third aspect of the present disclosure, in the processor of the second aspect, the processor is configured to perform a control to make the change amount of the display position of the first display image smaller than an amount that a user of the display device is capable of recognizing a change of the display position of the first display image while the display position of the second display image is changed following the change of the relative position.

According to a processor of a fourth aspect of the present disclosure, in the processor of the third aspect, the processor is configured to perform a control to set the change amount of the display position of the first display image to zero.

According to a processor of a fifth aspect of the present disclosure, in the processor of the fourth aspect, the processor is configured to perform a control not to display the first display image, in a case in which a position where the object exists is outside a range that is capable of being displayed by the display device.

According to a processor of a sixth aspect of the present disclosure, in the processor of the fifth aspect, the processor is configured to perform a control to display the second display image such that the user is capable of visually recognizing a relation between the object and the first display image, or the user is capable of visually recognizing a relation between a virtual object image corresponding to the object and the first display image in a display region in which the first display image is displayed.

According to a processor of a seventh aspect of the present disclosure, in the processor of the sixth aspect, the control of displaying the second display image is a control of displaying the object and the first display image to be connected, or a control of displaying the virtual object image and the first display image to be connected.

According to a processor of an eighth aspect of the present disclosure, in the processor of the seventh aspect, a position of the display device changes in the real space.

According to a processor of a ninth aspect of the present disclosure, in the processor of the eighth aspect, a position of the object changes in the real space.

In order to achieve the above object, an image processing device of a tenth aspect of the present disclosure is a control device that performs a control to display a first display image and a second display image in a display region of a transmissive display device.

The image processing device comprises at least a processor, in which the processor is configured to convert a position of the first display image to a position in a real space, detect a relative change between the position of the first display image in the real space after the conversion and a position of an object, perform a control to display the first display image in the display region while a display position is fixed regardless of the relative change, and perform a control to display the second display image by changing the display position based on the relative change.

In order to achieve the above object, a glasses-type information display device of an eleventh aspect of the present disclosure comprises a transmissive display device and the processor of the present disclosure.

In order to achieve the above object, an image processing method of a twelfth aspect of the present disclosure executed by a processor, comprises displaying a first display image that displays information related to an object existing in a real space and a second display image on a transmissive display device, changing a display position of the second display image based on a change of a relative position between the display device and the object, and performing a control to make a change amount of a display position of the first display image smaller than a change amount of the display position of the second display image.

In order to achieve the above object, a non-transitory storage medium storing an image processing program of a thirteenth aspect of the present disclosure for causing a processor to execute a process comprises displaying a first display image that displays information related to an object existing in a real space and a second display image on a transmissive display device, changing a display position of the second display image based on a change of a relative position between the display device and the object, and performing a control to make a change amount of a display position of the first display image smaller than a change amount of the display position of the second display image.

According to the present disclosure, it is possible to reduce the afterimage and make it easier to visually recognize the display image for performing navigation with respect to the object.

DESCRIPTION OF EMBODIMENTS

Hereinafter, examples of an embodiment for implementing the technique of the present disclosure will be described in detail with reference to the drawings.

First Embodiment

Figure 1:
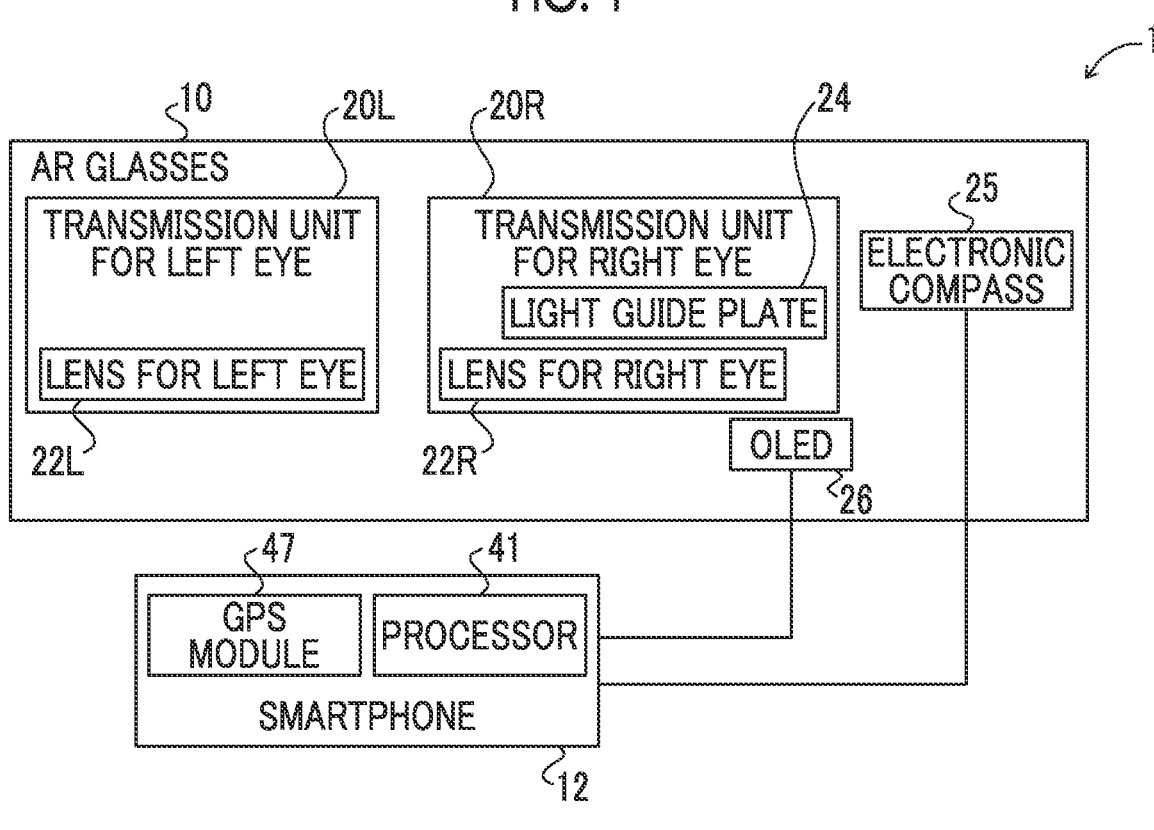
FIG. 1 is a configuration diagram showing an example of a configuration of a glasses-type information display device according to a first embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
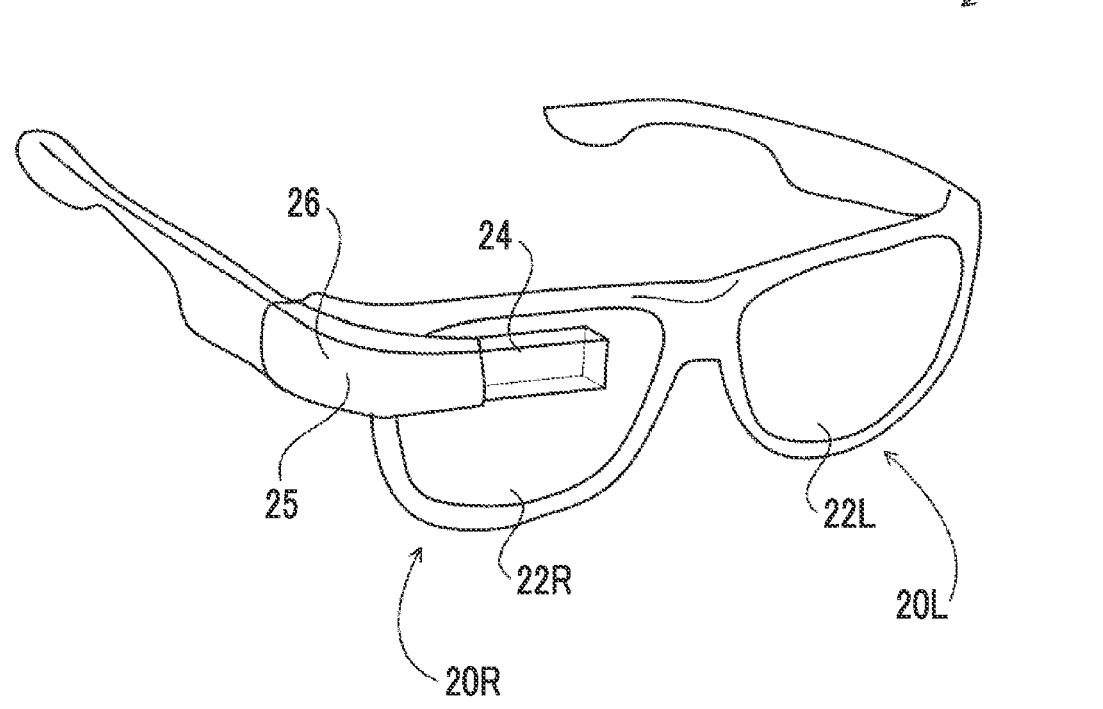
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, an electronic compass 25, and an OLED 26. The AR glasses 10 of the present embodiment are an example of a transmissive display device of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes a real space, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real space shown through the lens 22R for a right eye. In addition, while the projection image is not projected from the OLED 26, the visually-recognized image visually recognized by the user is the real image that represents the real space shown through the lens 22R for a right eye and the light guide plate 24.

Meanwhile, the transmission unit 20L for a left eye includes a lens 22L for a left eye. The user visually recognizes the real space, which is shown through the lens 22L for a left eye, with the left eye.

The electronic compass 25 has a function of detecting the geomagnetism and specifying an orientation based on the detected geomagnetism. The electronic compass 25 of the present embodiment is a sensor for detecting a direction in which the AR glasses 10 are facing, in other words, a visual field direction of the user. The direction detected by the electronic compass 25 is output to the smartphone 12.

On the other hand, the smartphone 12 comprises a central processing unit (CPU) 40 and a global positioning system (GPS) module 47. The CPU 40 of the present embodiment controls the OLED 26 to project the projection image onto the light guide plate 24 from the OLED 26.

The GPS module 47 is a sensor for detecting a position where the smartphone 12 exists. The GPS module 47 receives a signal from the GPS satellite and specifies longitude and latitude of the position of the smartphone 12 based on the received signal. The GPS module 47 outputs the specified longitude and latitude.

Figure 3:
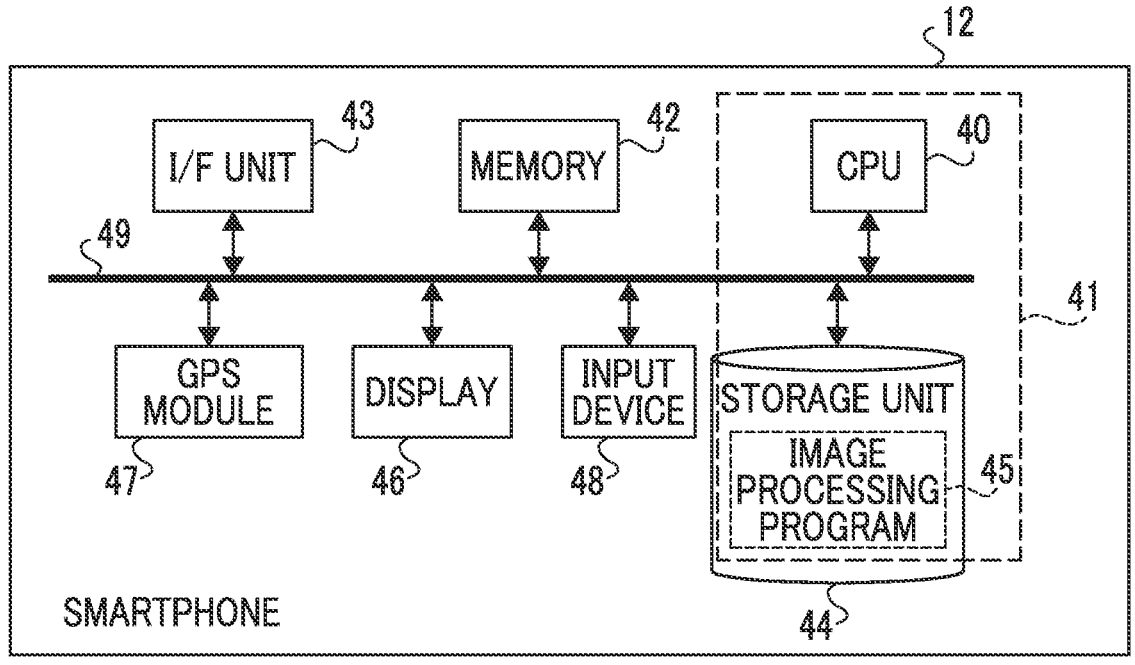
FIG. 3 is a block diagram showing an example of a hardware configuration of the smartphone according to the first embodiment.

FIG. 3 shows a block diagram showing an example of a hardware configuration of the smartphone 12. As shown in FIG. 3, the smartphone 12 comprises the CPU 40, a memory 42, an interface (UF) unit 43, a storage unit 44, a display 46, the GPS module 47, and an input device 48. The CPU 40, the memory 42, the OF unit 43, the storage unit 44, the display 46, the GPS module 47, and the input device 48 are connected to each other via a bus 49, such as a system bus or a control bus, such that various types of information can be given and received therebetween.

The CPU 40 reads out various programs, which include an image processing program 45 stored in the storage unit 44, to the memory 42 and performs processing corresponding to the program read out. Accordingly, the CPU 40 performs a control of the display of the projected image by the OLED 26. As an example, the processor 41 of the present embodiment is composed of a combination of the CPU 40 and the image processing program 45. The memory 42 is a work memory that is used in a case in which the CPU 40 performs processing.

The image processing program 45 executed in the CPU 40 is stored in the storage unit 44. In addition, the image data (not shown) of the projection image projected from the OLED 26, various other types of information, and the like are also stored in the storage unit 44. Specific examples of the storage unit 44 include a hard disk drive (HDD), a solid state drive (SSD), and the like.

The OF unit 43 communicates various types of information to each of the OLED 26 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. In addition, the input device 48 is operated by a user so that various instructions related to the projection of the projection image and information related to the destination in the navigation are input. The input device 48 is not particularly limited, and examples of the input device 48 include a keyboard, a touch pen, a mouse, and the like. A touch panel display in which the display 46 and the input device 48 are integrated with each other is employed in the smartphone 12.

In addition, the function of the processor 41 of the smartphone 12 of the present embodiment will be described. The CPU 40 of the smartphone 12 of the present embodiment has a function of performing navigation to a destination set by the user by projecting a first projected image 81 and the second projected image 82 onto the lens 22R for a right eye of the AR glasses 10.

Here, a navigation function in the processor 41 of the present embodiment will be described. Here, a case in which navigation is performed to a bus stop set as a destination by the user will be explained as an example.

The destination is set by the user, for example, by the user inputting place names, station names, stop names, building names, and the like by the input device 48, or by the user designating points on the map displayed on the display 46 by the input device 48. In the processor 41 of the present embodiment, a target object is set according to the destination. For example, in a case in which the user sets a bus stop as a destination, the processor 41 sets, in the real world, a land corresponding to a position (coordinates) where the bus stop exists, a signpost on which the name of the bus stop is posted, or the like as the target object. The method of setting the target object according to the destination is not particularly limited, and for example, a setting rule or the like may be determined in advance. The target object of the present embodiment is an example of the object of the present disclosure.

Figure 4A:
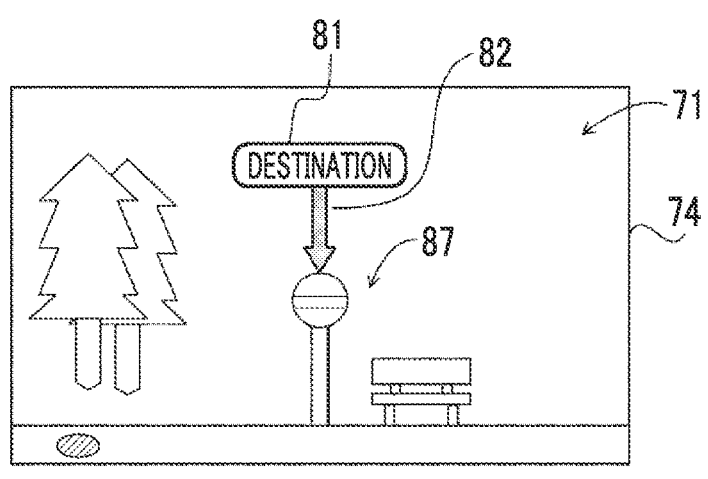
FIG. 4A is a diagram for explaining a navigation function by a processor according to the first embodiment.
Figure 4B:
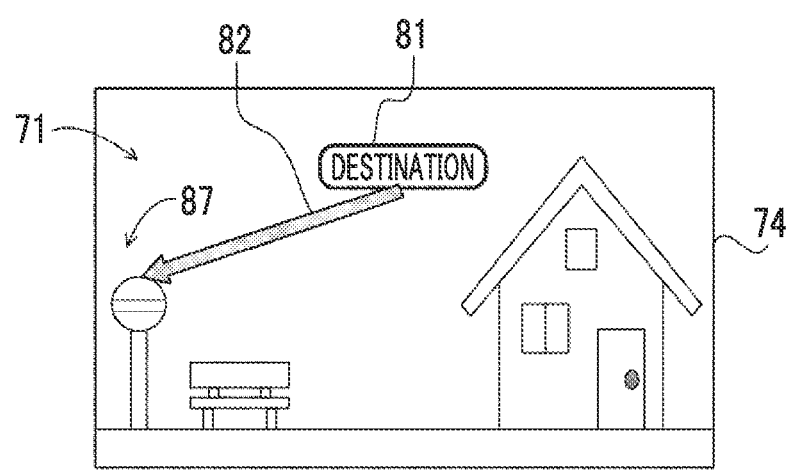
FIG. 4B is a diagram for explaining a navigation function by the processor according to the first embodiment.

FIG. 4A and FIG. 4B show a state in which the user U visually recognizes a real space 70 in which a target object 72 exists through the AR glasses 10.

In addition, FIG. 4A and FIG. 4B show a state in which the first projected image 81 and the second projected image 82 are projected onto a display region 80A of a virtual projection surface of the AR glasses 10. The first projected image 81 of the present embodiment is an example of a first display image of the present disclosure, and the second projected image 82 of the present embodiment is an example of a second display image of the present disclosure. In addition, a virtual target object image 86 representing the target object 72 is also shown in the display region 80A of the virtual projection surface. The virtual target object image 86 is obtained, for example, by converting coordinates of the target object 72 in the real space 70 to coordinates of the virtual projection surface using a known projective transformation or the like (details will be described later).

The first projected image 81 is an image that displays information related to the target object 72 existing in the real space 70. In addition, in FIG. 4A and FIG. 4B, the character image "destination" is used as an image displaying information related to the target object 72 existing in the real space 70, but it is not limited to the present embodiment, and for example, may be a character image representing the name of the destination (in the case of FIG. 4A and FIG. 4B, the name of the bus stop), or the like, or may be other than the character image.

On the other hand, the second projected image 82 is an image that is displayed so that the user U can visually recognize the relation between the target object 72 or the virtual target object image 86 and the first projected image 81. As shown in FIG. 4A and FIG. 4B, as an example, the second projected image 82 of the present embodiment is an image representing an arrow in which a start point is the first projected image 81 and an end point is the virtual target object image 86, and is displayed to connect the virtual target object image 86 and the first projected image 81.

By displaying the first projected image 81 and the second projected image 82 in the display region 80A in this way, the user U visually recognizes a real image 71 including a destination image 87 corresponding to the target object 72 and a visually-recognized image 74 including the first projected image 81 and the second projected image 82.

FIG. 4B shows a state in which the user U turns user's head to the right direction from the state shown in FIG. 4A. In this case, the relative position between the target object 72 and the AR glasses 10 change, and the position of the target object 72 in the field of view of the user U moves to the left direction as compared with the case shown in FIG. 4A. Therefore, the position of the virtual target object image 86 in the display region 80A also moves to the left direction.

The display position of the first projected image 81 in the display region 80A does not change even if the relative position between the AR glasses 10 (user U) and the target object 72 changes. In other words, even if the position of the virtual target object image 86 with respect to the display region 80A changes, the display position of the first projected image 81 does not change. That is, the change amount of the display position of the first projected image 81 in the display region 80A is zero regardless of the change of the relative position between the AR glasses 10 and the target object 72. Therefore, the position of the first projected image 81 in the visually-recognized image 74 visually recognized by the user U does not change. Therefore, the first projected image 81 is visually recognized by the user U as if it is not moving regardless of the change of the relative position.

On the other hand, the second projected image 82 is displayed so as to follow changes in the relative position between the AR glasses 10 and the target object 72. In the examples shown in FIG. 4A and FIG. 4B, the second projected image 82 is displayed in a way that the shape, the direction of the arrow, and the like change to connect the first projected image 81 and the target object 72 (virtual target object image 86). Therefore, the second projected image 82 is visually recognized by the user U such that the display changes following the change of the relative position.

In this way, the processor 41 of the present embodiment performs the navigation to the destination by displaying the first projected image 81 with the change amount of the display position as zero, and displaying the second projected image 82 so as to connect the first projected image 81 and the target object 72 (virtual target object image 86).

Figure 5:
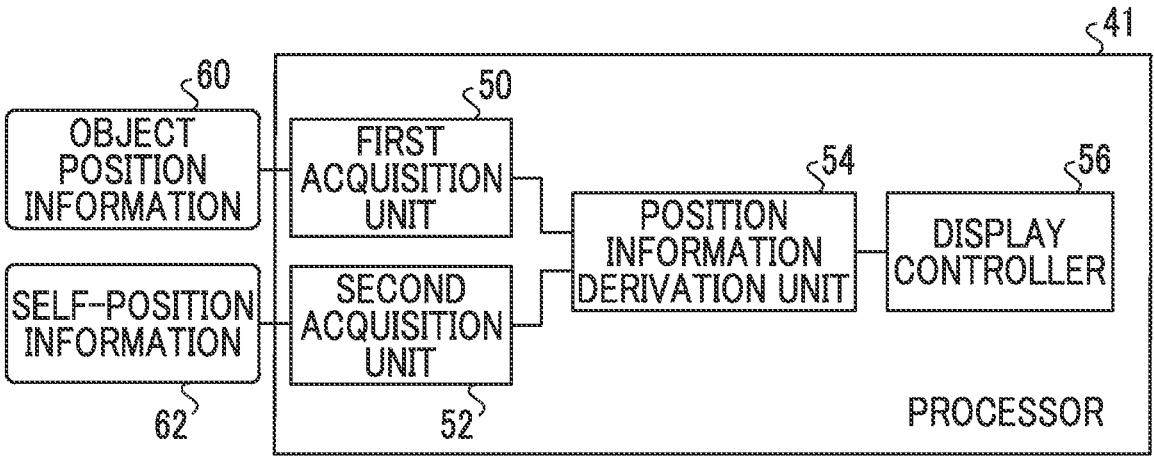
FIG. 5 is a block diagram showing an example of a configuration of the processor according to the first embodiment.

FIG. 5 shows a functional block diagram showing an example of a configuration related to the function of the processor 41 of the present embodiment. As shown in FIG. 5, the processor 41 comprises a first acquisition unit 50, a second acquisition unit 52, a position information derivation unit 54, and a display controller 56. As an example, in the processor 41 of the present embodiment, the CPU 40 executes the image processing program 45 stored in the storage unit 44, so that the CPU 40 functions as the first acquisition unit 50, the second acquisition unit 52, the position information derivation unit 54, and the display controller 56.

The first acquisition unit 50 has a function of acquiring object position information 60. The object position information 60 is information indicating a position of the target object 72. As an example, the object position information 60 of the present embodiment is information indicating the latitude and longitude of the real space 70 corresponding to the destination input by the user U. Therefore, the first acquisition unit 50 acquires, for example, the object position information 60 indicating the position of the target object 72 input by the user with reference to the map data provided by an external server or the like. The first acquisition unit 50 outputs the acquired object position information 60 to the position information derivation unit 54.

The second acquisition unit 52 has a function of acquiring self-position information 62. The self-position information 62 is information indicating a position and a direction (visual field direction) of the AR glasses 10. In the present embodiment, since the user U moves in a state of holding the AR glasses 10 and the smartphone 12, it is assumed that the position of the smartphone 12 and the position of the AR glasses 10 are equal to each other. As an example, the self-position information 62 of the present embodiment includes information indicating the longitude and latitude of the position of the smartphone 12 received by the GPS module 47 as information indicating the position of the AR glasses 10. In addition, the self-position information 62 includes information indicating the visual field direction of the user U acquired from the electronic compass 25 of the AR glasses 10. Therefore, the second acquisition unit 52 acquires the self-position information 62 from the electronic compass 25 of the GPS module 47 and the AR glasses 10. The second acquisition unit 52 outputs the acquired self-position information 62 to the position information derivation unit 54.

Figure 6:
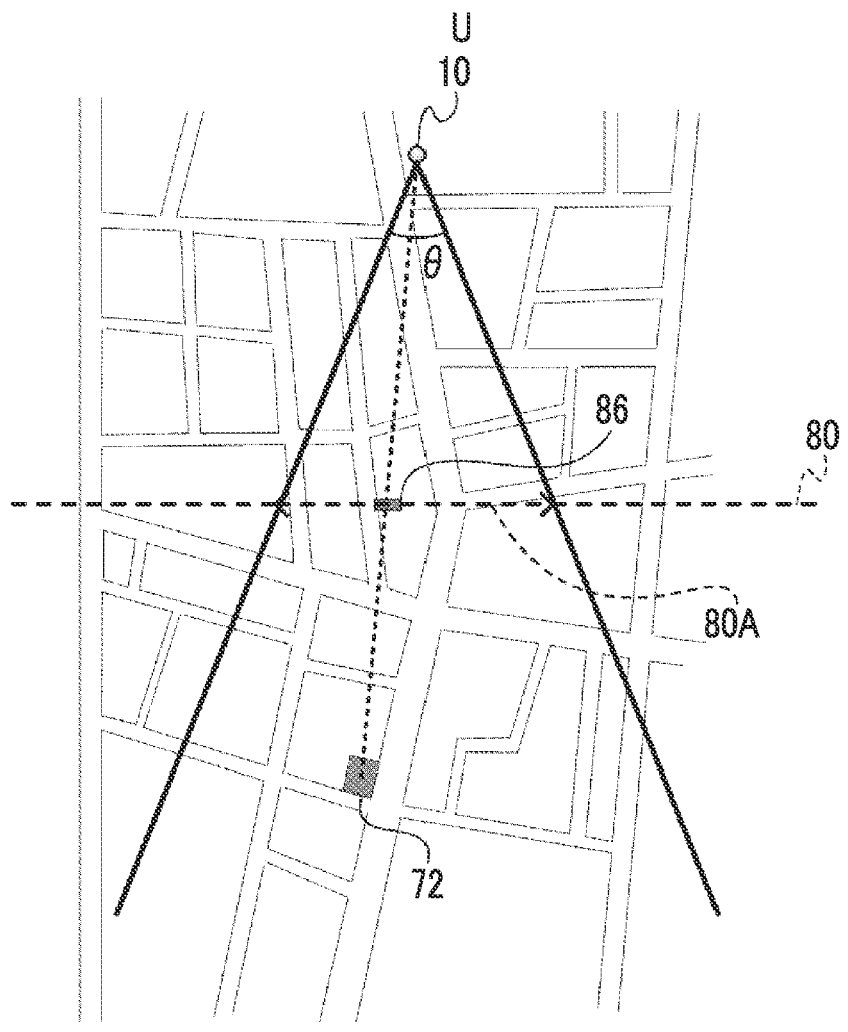
FIG. 6 is a diagram for explaining an example of a method of deriving position information of a virtual target object image.

The position information derivation unit 54 has a function of deriving position information indicating the position of the target object 72. As an example, the position information derivation unit 54 of the present embodiment derives coordinates indicating the position of the virtual target object image 86 in the virtual projection surface 80 as position information indicating the position of the target object 72. An example of a method of deriving the position information of the virtual target object image 86 will be explained with reference to FIG. 6. The position information derivation unit 54 derives the display position of the virtual target object image 86 in the virtual projection surface 80 by converting the position of the target object 72 to the coordinates of the virtual projection surface 80 by using a known projective transformation or the like. As an example, the position information derivation unit 54 derives the position of the virtual projection surface 80 from the position of the AR glasses 10 included in the object position information 60, a direction in which the user U is facing (visual field direction), and a visual angle θ of the AR glasses 10. In addition, the position information derivation unit 54 derives the position (coordinates) of the virtual target object image 86 in a case in which the target object 72 is projected onto the virtual projection surface 80. For example, the position information derivation unit 54 converts coordinates of a local coordinate system indicating the position of the target object 72 to coordinates of a world coordinate system by modeling conversion, and further converts the coordinates to coordinates in the virtual projection surface 80 by performing viewing conversion and projection conversion. The position information derivation unit 54 outputs the display position (coordinates) of the virtual target object image 86 in the virtual projection surface 80 to the display controller 56. An embodiment may be used in which a viewport conversion is performed on the display position (coordinates) of the virtual target object image 86 in the virtual projection surface 80, and the coordinates converted to the coordinate system of the projection image of the AR glasses 10 are output as position information indicating the position of the target object 72.

The display controller 56 has a function of performing a control to display the first projected image 81 and the second projected image 82. Specifically, the display controller 56 acquires first image data of a first projection image for displaying the first projected image 81 and second image data of a second projection image for displaying the second projected image 82. As an example, in the present embodiment, since the first image data and the second image data are stored in the storage unit 44 of the smartphone 12, the display controller 56 acquires the first image data and the second image data from the storage unit 44. In addition, unlike in the present embodiment, an embodiment in which the first image data and the second image data are acquired from an external device of the smartphone 12 via the I/F unit 43 may be used. The display controller 56 performs a control to display the first projected image 81 and the second projected image 82 by projecting the first projection image corresponding to the first image data and the second projection image corresponding to the second image data from the OLED 26.

In addition, the display controller 56 has a function of changing the display position of the second projected image 82 based on the change of the relative position between the AR glasses 10 and the target object 72, and making the change amount of the display position of the first projected image 81 smaller than the change amount of the display position of the second projected image 82. Specifically, as described above, the display controller 56 performs a control to display the change amount of the display position of the first projected image 81 as zero. The display position of the first projected image 81 may be a predetermined position, a position designated by the user, and a position according to a position of the target object 72 in the real space 70, a type, and the like.

Further, as described above, the display controller 56 performs a control to display the second projected image 82 to connect the first projected image 81 and the target object 72 (virtual target object image 86). As an example, as described above, the display controller 56 of the present embodiment performs a control to display the second projected image 82 as an image indicating an arrow having a direction in which a predetermined position in the first projected image 81 is set to a start point (hereinafter, referred to as a start point of the second projected image 82), and the target object 72 (virtual target object image 86) is set to an end point (hereinafter, referred to as an end point of the second projected image 82).

Figure 7:
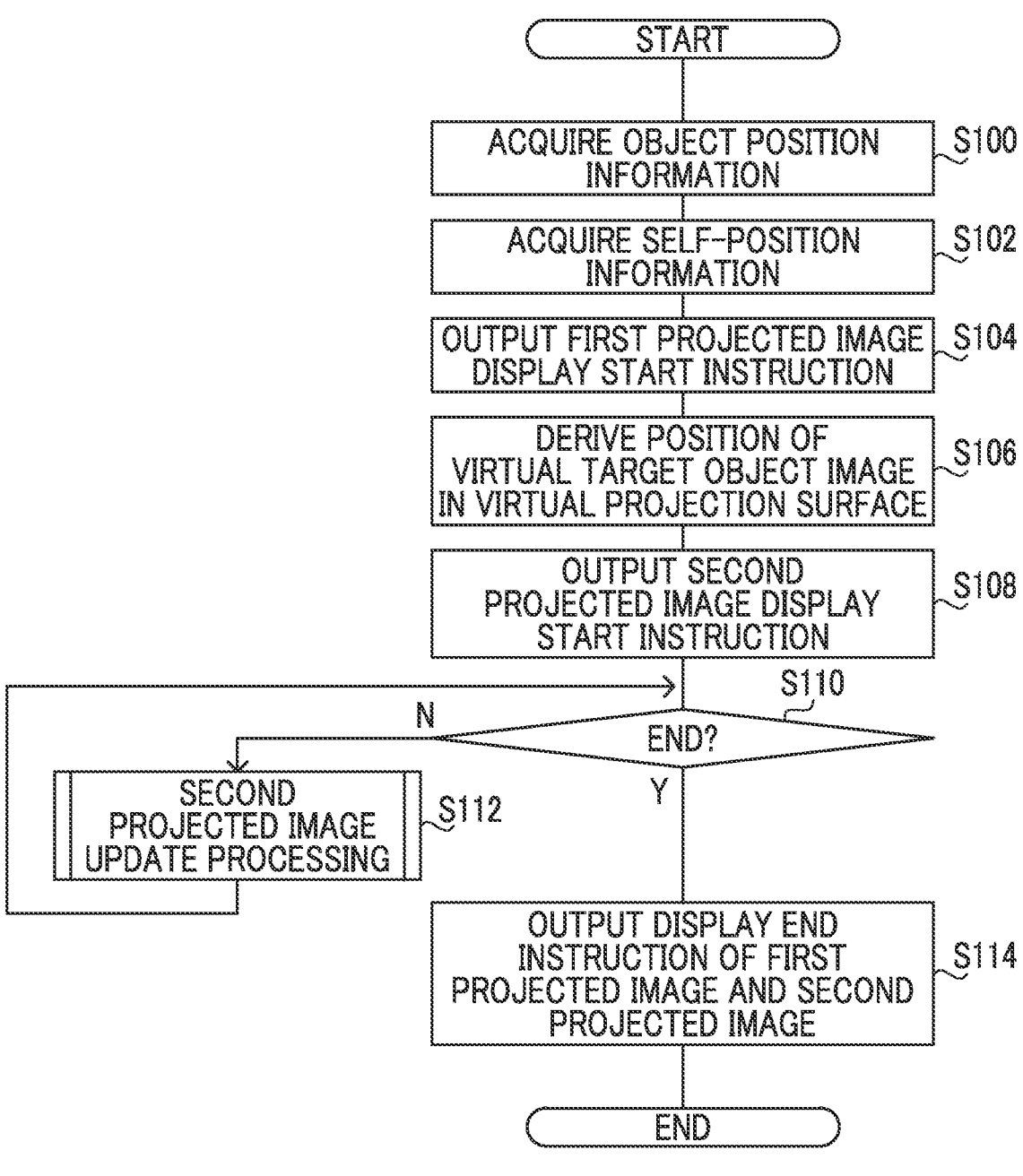
FIG. 7 is a flowchart showing an example of image processing executed by the processor according to the first embodiment.

Next, the action of the processor 41 of the present embodiment will be described. FIG. 7 shows a flowchart showing an example of the flow of image processing by the processor 41 of the present embodiment. As an example, in the smartphone 12 of the present embodiment, the CPU 40 of the processor 41 executes the image processing program 45 stored in the storage unit 44 to perform the image processing of which an example is shown in FIG. 7 in a case in which an instruction to start navigation, which is input using the input device 48 by the user, is received.

In Step S100 of FIG. 7, the first acquisition unit 50 acquires the object position information 60 of the target object 72. As described above, the first acquisition unit 50 acquires the object position information 60 indicating the position of the target object 72 input by the user with reference to the map data provided by an external server or the like.

In the next step S102, the second acquisition unit 52 acquires the self-position information 62. As described above, the second acquisition unit 52 acquires the latitude and longitude of the position where the smartphone 12 exists from the GPS module 47, and acquires the direction (visual field direction) in which the user is facing from the electronic compass 25.

In the next step S104, the display controller 56 outputs a display start instruction to start the display of the first projected image 81. Specifically, the display controller 56 outputs the first image data and the display start instruction to the OLED 26 such that the first projected image 81 is projected onto the light guide plate 24. In a case in which the first image data and the display start instruction are input from the smartphone 12, the OLED 26 projects the first projection image corresponding to the first image data onto the light guide plate 24. Accordingly, the first projected image 81 is displayed, and the user can visually recognize the first projected image 81.

In the next step S106, the position information derivation unit 54 derives the position of the virtual target object image 86 in the virtual projection surface 80 as position information indicating the position of the target object 72. As described above, the position information derivation unit 54 converts the position of the target object 72 in the real space 70 to the position (coordinates) of the virtual target object image 86 in the virtual projection surface 80 by a known projective transformation or the like.

In the next step S108, the display controller 56 outputs a display start instruction to start the display of the second projected image 82. Specifically, the display controller 56 outputs second image data and a display start instruction to the OLED 26 to project the second projected image 82 in which a start point is the display position of the first projected image 81, which has started to be displayed in Step S104, and an end point is the display position of the virtual target object image 86 derived in Step S106 into the light guide plate 24. In a case in which the second image data and the display start instruction are input from the smartphone 12, the OLED 26 projects the second projection image corresponding to the second image data onto the light guide plate 24. Accordingly, the second projected image 82 is displayed, and the user can visually recognize the second projected image 82.

In the next step S110, the display controller 56 determines whether or not to end the navigation to the destination. As an example, in the present embodiment, in a case in which an instruction to end the navigation from the user U using the input device 48 is received, the navigation ends. Therefore, in a case in which the instruction to end the navigation is not received, the determination in Step S110 is a negative determination, and the processing proceeds to Step S112 to execute the second projected image update processing for updating the display of the second projected image 82 shown in FIG. 8.

Figure 8:
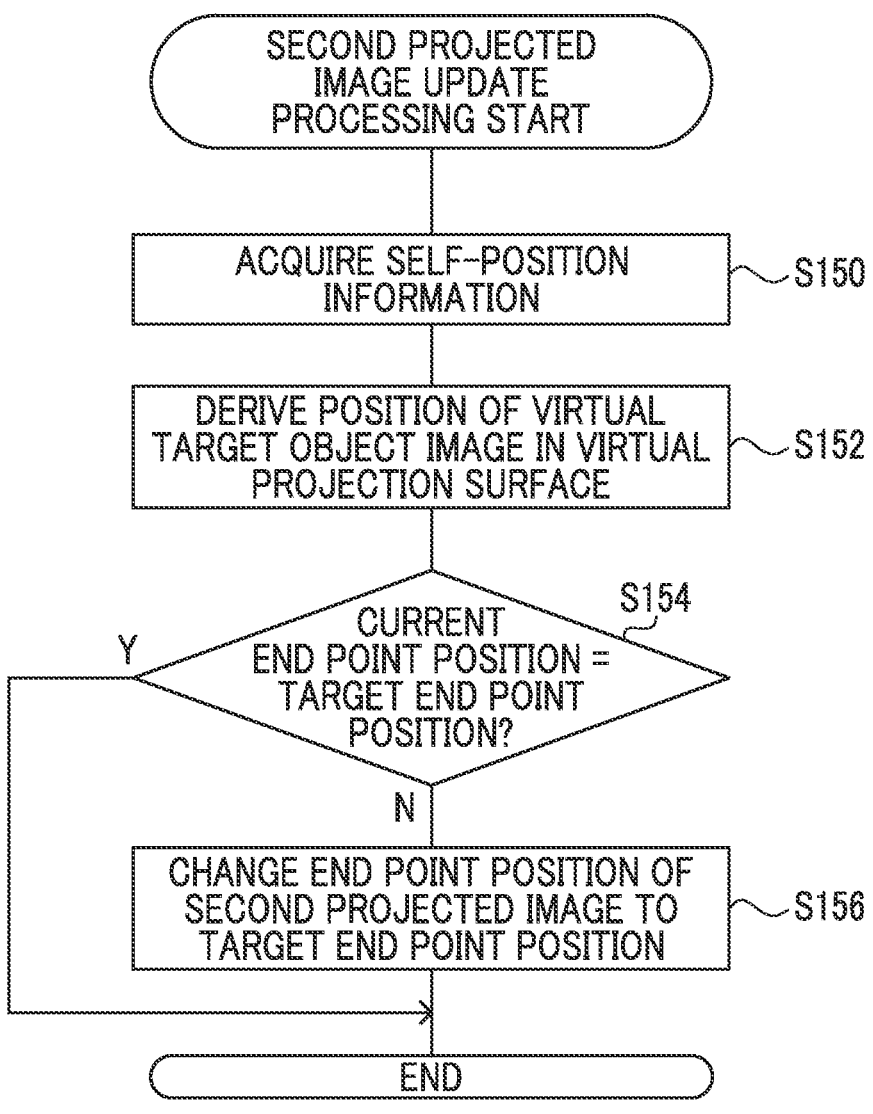
FIG. 8 is a flowchart showing an example of second projected image update processing in the image processing.

As shown in FIG. 8, in Step S150 of the second projected image update processing, the second acquisition unit 52 acquires the self-position information 62 in the same manner as in Step S102. In at least one of a case in which the user U is moving or a case in which the direction of the user U is changing, a self position indicated by the self-position information 62 acquired by the second acquisition unit 52 is changed from the self position indicated by the self-position information 62 acquired by the second acquisition unit 52 last time.

In the next step S152, the position information derivation unit 54 derives the position of the virtual target object image 86 in the virtual projection surface 80 as position information indicating the position of the target object 72 in the same manner as in Step S106.

In the next step S154, the position information derivation unit 54 determines whether or not a current end point position coincides with a target end point position for the end point of the second projected image 82. The current end point position is the end point position of the second projected image 82 currently being displayed. The target end point position is the position of the virtual target object image 86 derived in Step S152. Here, the term "coincide" is not limited to a case of perfect coinciding, and a difference that can be regarded as coinciding may occur in consideration of an error and a tolerance. In a case in which the current end point position and the target end point position coincide with each other, the determination in Step S154 is an affirmative determination, the second projected image update processing shown in FIG. 8 ends, and the processing returns to Step S110 of the image processing shown in FIG. 7.

On the other hand, in a case in which the current end point position is different from the target end point position, the determination in Step S154 is a negative determination, and the processing proceeds to Step S156.

In Step S156, the display controller 56 displays the second projected image 82 in which the end point position is changed from the current end point position to the target end point position. In a case in which the processing of Step S156 ends, the second projected image update processing shown in FIG. 8 ends, and the processing returns to Step S110 of the image processing shown in FIG. 7.

On the other hand, in a case in which the instruction to end the navigation is received, the determination in Step S110 is a negative determination, and the processing proceeds to Step S114.

In Step S114, the display controller 56 outputs a display end instruction to end the display of the first projected image 81 and the second projected image 82 to the OLED 26. In a case in which the display end instruction is input to the OLED 26 from the smartphone 12, the OLED 26 ends the projection of the first projected image 81 and the second projected image 82. Accordingly, the display of the first projected image 81 and the second projected image 82 ends. In a case in which the processing of Step S114 ends, the image processing shown in FIG. 7 ends.

Accordingly, the processor 41 of the present embodiment displays the first projected image 81 with the change amount of the display position as zero regardless of the change of the relative position between the AR glasses 10 and the target object 72 during the execution of the navigation to the destination. In addition, the processor 41 displays the second projected image 82 that has followed the change of the relative position between the AR glasses 10 and the target object 72.

Therefore, according to the processor 41 of the present embodiment, it is possible to perform navigation to the destination appropriately. In addition, according to the processor 41, in displaying the first projected image 81 and the second projected image 82 for performing the navigation to the destination, it is possible to prevent an afterimage of the first projected image 81 from occurring and the first projected image 81 and the second projected image 82 can be easily visually recognized.

Figure 9A:
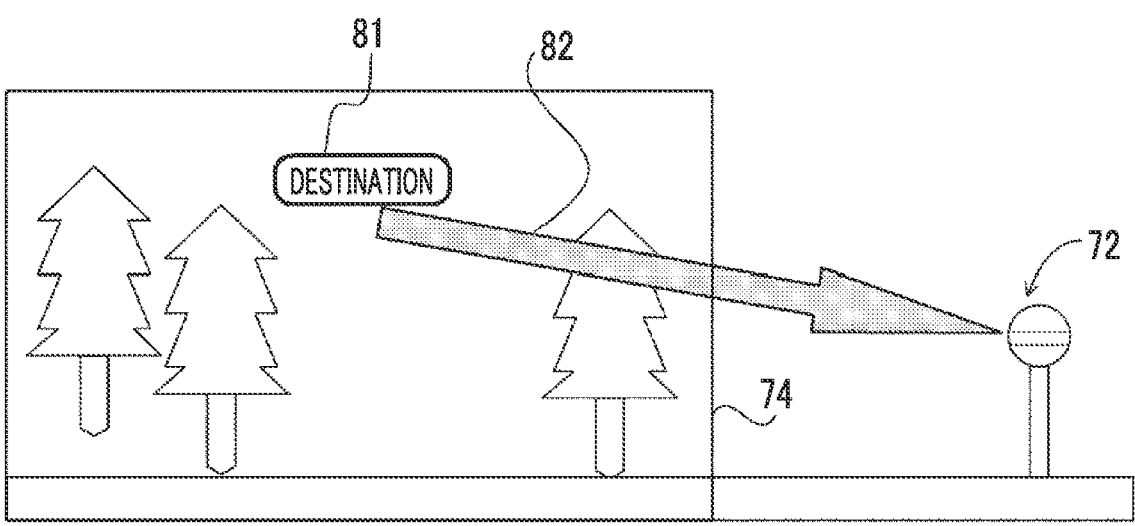
FIG. 9A is a diagram showing an example of a second projected image according to a distance between the AR glasses and a target object.
Figure 9B:
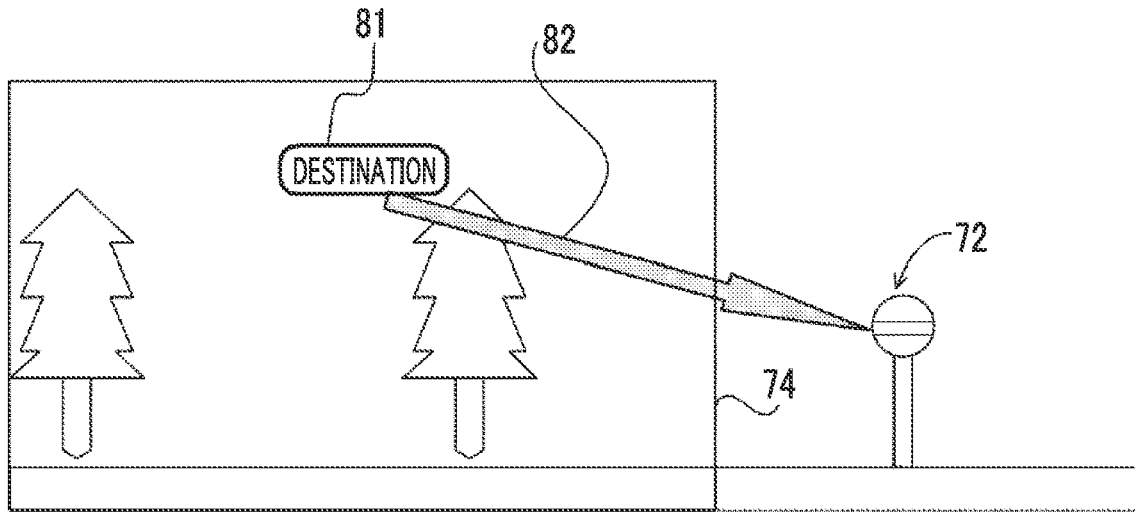
FIG. 9B is a diagram showing an example of the second projected image according to the distance between the AR glasses and the target object.

In some cases, the position where the target object 72 exists is outside the range that is capable of being displayed by the AR glasses 10. For example, in a case in which the display position of the virtual target object image 86 is outside the display region 80A of the virtual projection surface 80, the target object 72 exists outside a range that is capable of being visually recognized by the AR glasses 10. In such a case, for example, the second projected image 82 may be displayed such that the first projected image 81 and the target object 72 or the virtual target object image 86 are connected to each other. In this case, as shown in FIG. 9A and FIG. 9B, the display form of the second projected image 82 may be varied depending on a distance between the AR glasses 10 and the target object 72. In the examples shown in FIG. 9A and FIG. 9B, as the distance between the AR glasses 10 and the target object 72 increases, the arrow image, which is the second projected image 82, becomes thicker. Specifically, a distance between the AR glasses 10 and the target object 72 in FIG. 9A is greater than a distance between the AR glasses 10 and the target object 72 in FIG. 9B. Therefore, an arrow of the second projected image 82 shown in FIG. 9A is thicker than an arrow of the second projected image 82 shown in FIG. 9B. At least one of the color or the type of the arrow may be varied instead of the thickness of the arrow of the second projected image 82. In addition, in a case in which the thickness of the arrow of the second projected image 82 is varied, a thickness of the start point on the first projected image 81 side may not be varied, and a thickness of the end point on the target object 72 side may be varied depending on the distance between the AR glasses 10 and the target object 72. In addition, the second projected image 82 may be turned on and off, and a speed at which the second projected image 82 is turned on and off may be varied depending on the distance between the AR glasses 10 and the target object 72.

In this way, by varying the display form of the second projected image 82 depending on the distance between the AR glasses 10 and the target object 72, even if the target object 72 is outside the visual recognition range of the user U, it is possible to transmit to the user U how far the target object 72 is.

In addition, in a case in which the position where the target object 72 exists is outside the range that is capable of being displayed by the AR glasses 10, the display controller 56 may perform a control not to display the second projected image 82 or may perform a control not to display the first projected image 81 and the second projected image 82.

Second Embodiment

In the first embodiment, an aspect in which the relative position between the AR glasses 10 and the target object 72 changes due to a movement of the AR glasses 10 (user U) with respect to the target object 72 has been described. On the other hand, in the present embodiment, an aspect in which the relative position between the AR glasses 10 and the target object 72 changes due to a movement of the target object 72 with respect to the AR glasses 10 (user U) will be described.

Figure 10:
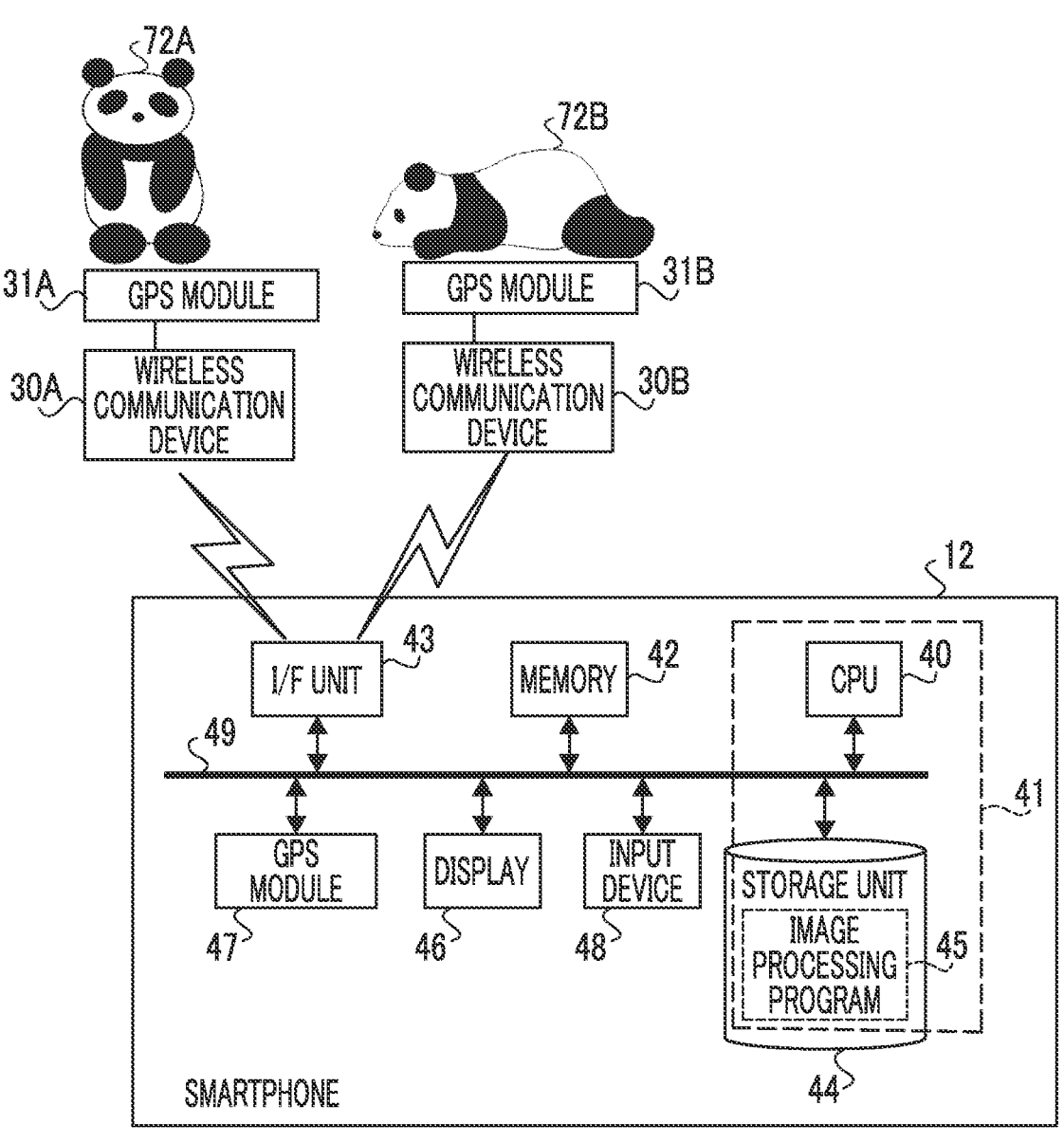
FIG. 10 is a block diagram showing an example of a hardware configuration of a smartphone according to a second embodiment.

FIG. 10 shows a block diagram showing an example of a hardware configuration of the smartphone 12. Although the hardware configuration of the smartphone 12 of the present embodiment is the same as the hardware configuration of the smartphone 12 of the first embodiment (refer to FIG. 3), the OF unit 43 is different in that it wirelessly communicates with a wireless communication device 30A and a wireless communication device 30B. The wireless communication device 30A has a function of wirelessly transmitting the object position information 60 indicating a position where a target object 72A exists, which is output from a GPS module 31A mounted on the target object 72A. In addition, the wireless communication device 30B has a function of wirelessly transmitting the object position information 60 indicating a position where a target object 72B exists, which is output from a GPS module 31B mounted on the target object 72B.

Figure 11:
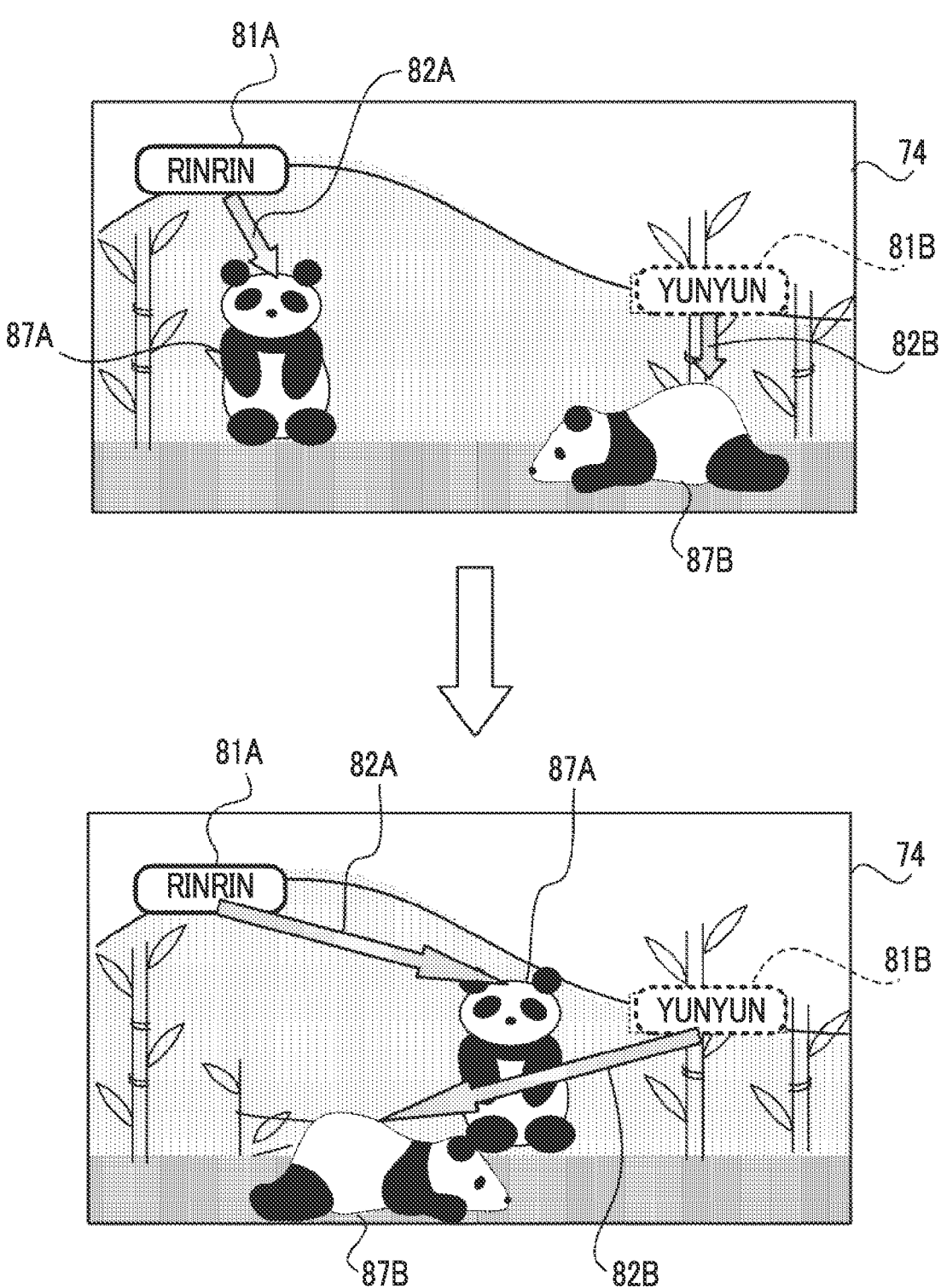
FIG. 11 is a diagram for explaining a display example of a first projected image and a second projected image by a processor according to the second embodiment.

As an example, in the present embodiment, the position of the AR glasses 10 (user U) does not change, but the positions of the target object 72A and the target object 72B change. FIG. 11 shows an example of a change of the visually-recognized image 74 visually recognized by the user U through the AR glasses 10 in a case in which the positions of the target object 72A and the target object 72B in the real space 70 change.

In the visually-recognized image 74 shown in FIG. 11, with respect to the target object 72A, a first projected image 81A indicating the name "Rinrin" of the target object 72A, and a second projected image 82A displayed to connect a destination image 87A corresponding to the target object 72A and the first projected image 81A are included. In addition, with respect to the target object 72B, a first projected image 81B indicating the name "Yunyun" of the target object 72B, and a second projected image 82B displayed to connect a destination image 87B corresponding to the target object 72B and the first projected image 81B are included.

As shown in FIG. 11, even in a case in which the target object 72A moves and the position of the destination image 87A changes, the display position of the first projected image 81A does not change, and the position of the first projected image 81A to be visually recognized does not change. On the other hand, the display of the second projected image 82A changes following the movement of the target object 72A (destination image 87A), and a state of being visually recognized also changes. Similarly, even in a case in which the target object 72B moves and the position of the destination image 87B changes, the display position of the first projected image 81B does not change, and the position of the first projected image 81B to be visually recognized does not change. On the other hand, the display of the second projected image 82B changes following the movement of the target object 72B (destination image 87B), and a state of being visually recognized also changes.

In addition, the configuration related to the function of the processor 41 of the present embodiment comprises the first acquisition unit 50, the second acquisition unit 52, the position information derivation unit 54, and the display controller 56 in the same manner as that of the processor 41 of the first embodiment (refer to FIG. 5). As described above, the first acquisition unit 50 acquires the object position information 60 of the target object 72A from the wireless communication device 30A of the target object 72A, and also acquires the object position information 60 of the target object 72B from the wireless communication device 30B of the target object 72B.

Figure 12:
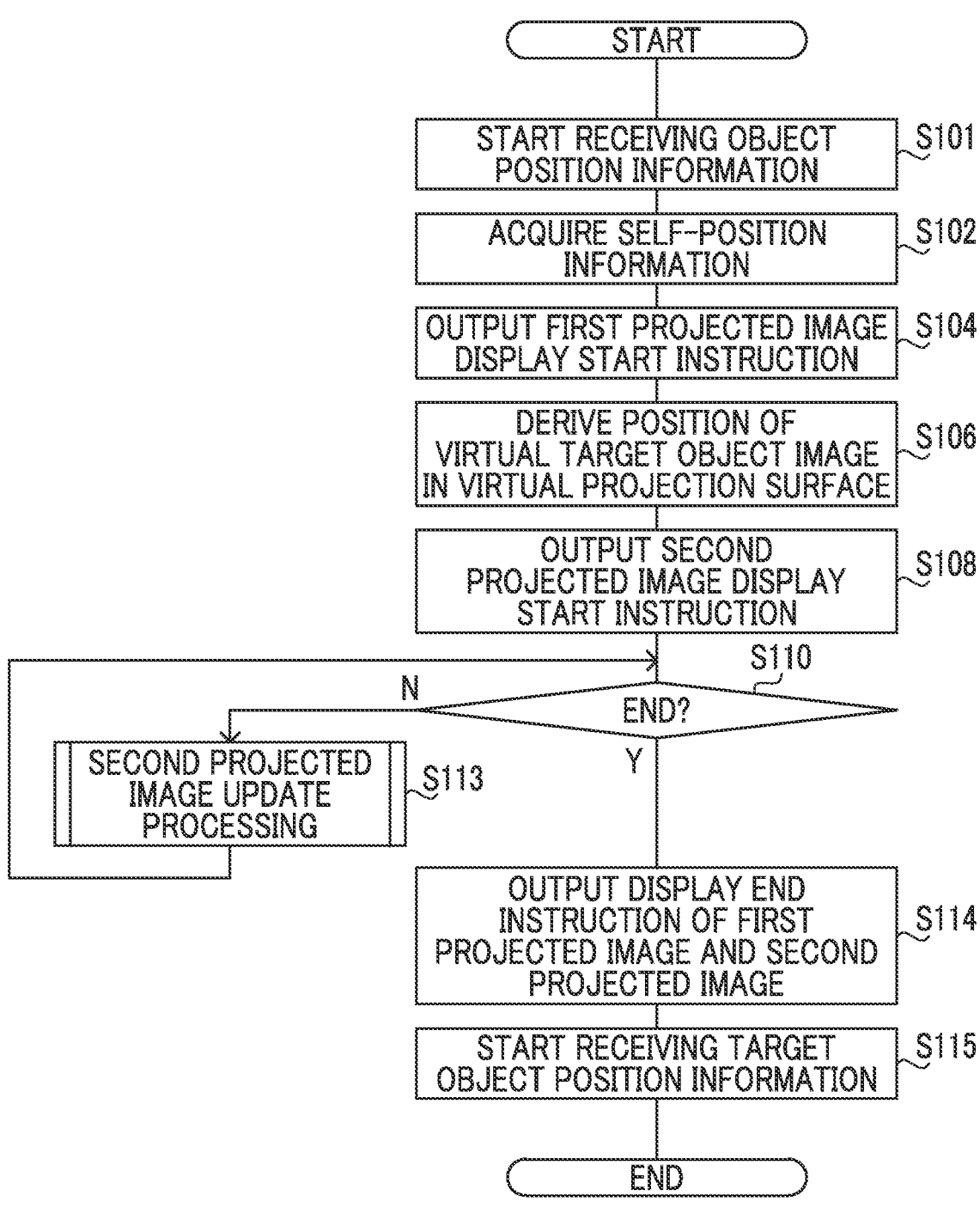
FIG. 12 is a flowchart showing an example of image processing executed by the processor according to the second embodiment.

Next, the action of the processor 41 of the present embodiment will be described. FIG. 12 shows a flowchart showing an example of the flow of image processing by the processor 41 of the present embodiment. The image processing of the present embodiment is different from the image processing of the first embodiment (refer to FIG. 7) in that the processing of Step S101 is comprised instead of Step S100.

In Step S101 of FIG. 12, the first acquisition unit 50 starts receiving the object position information 60 of each of the target object 72A and the target object 72B. As described above, the first acquisition unit 50 starts receiving the object position information 60 of the target object 72A from the wireless communication device 30A. In addition, the first acquisition unit 50 starts receiving the object position information 60 of the target object 72B from the wireless communication device 30B.

Figure 13:
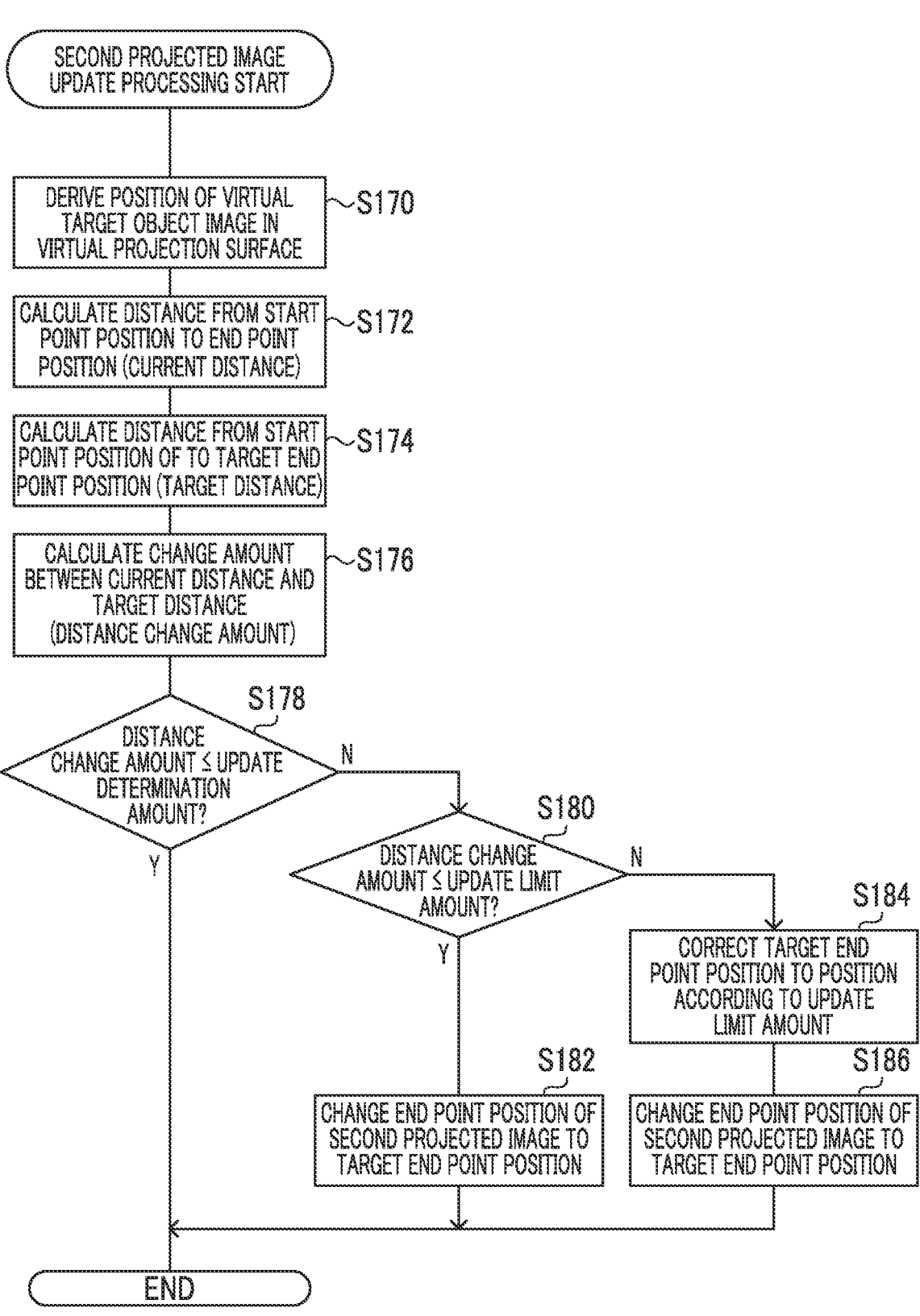
FIG. 13 is a flowchart showing an example of the second projected image update processing in the image processing.

In addition, the image processing of the present embodiment is different from the image processing of the first embodiment (refer to FIG. 7) in that the processing of Step S113 is comprised instead of Step S112. That is, in the present embodiment, the second projected image update processing is different from that of the first embodiment. FIG. 13 shows a flowchart showing an example of the second projected image update processing for updating the display of the second projected image 82 in the present embodiment.

In Step S170 of FIG. 13, the position information derivation unit 54 derives the position of the virtual target object image 86 in the virtual projection surface 80 as position information indicating the positions of the target object 72A and the target object 72B, respectively, in the same manner as in Step S152 of the second projected image update processing of the first embodiment (refer to FIG. 8). The end point position of the second projected image 82, which is the target of the change, is determined by the derived position of the virtual target object image 86. Hereinafter, the end point position will be referred to as a target end point position.

In the next step S172, the display controller 56 calculates a distance (hereinafter, referred to as a current distance) from the start point position of the second projected image 82 to the end point position (hereinafter, referred to as a current end point position) of the second projected image 82 currently being displayed. The display controller 56 calculates a current distance related to the second projected image 82 in the target object 72A and a current distance related to the second projected image 82 in the target object 72B.

In the next step S174, the display controller 56 calculates a distance (hereinafter, referred to as a target distance) from the start point position of the second projected image 82 to the target end point position of the second projected image 82 determined in Step S170. The display controller 56 calculates a target distance related to the second projected image 82 in the target object 72A and a target distance related to the second projected image 82 in the target object 72B.

In the next step S176, the display controller 56 calculates a change amount (hereinafter, referred to as a distance change amount) between the current distance and the target distance. Specifically, the display controller 56 derives an absolute value of a value obtained by subtracting the target distance from the current distance as a distance change amount.

In the next step S178, the display controller 56 determines whether or not the distance change amount is equal to or less than an update determination amount. In the present embodiment, in a case in which the distance change amount is relatively small, the display of the second projected image 82 is not updated. In other words, in a case in which the change amount of the relative position between the AR glasses 10 and the target object 72 is relatively small, the display of the second projected image 82 does not follow the change of the relative position. In a case in which the change amount of the relative position is relatively small, it is possible to suppress flickering caused by the change of the second projected image 82 by not changing the display of the second projected image 82. In addition, it is possible to reduce the processing load of the processor 41 for changing the display of the second projected image 82. The method of determining the update determination amount, which is a threshold value for determining whether or not to update the second projected image 82, is not particularly limited. The update determination amount may be, for example, an experimentally obtained value or a value that changes according to the current distance or the like.

In a case in which the distance change amount is equal to or less than the update determination amount, the determination in Step S178 is an affirmative determination, the second projected image update processing shown in FIG. 13 ends, and the processing returns to Step S110 of the image processing shown in FIG. 12. On the other hand, in a case in which the distance change amount exceeds the update determination amount, the determination in Step S178 is a negative determination, and the processing proceeds to Step S180.

In Step S180, the display controller 56 determines whether or not the distance change amount is equal to or less than the update limit amount. In the present embodiment, in a case in which the distance change amount is relatively large, the distance change amount is limited. In a case in which the distance change amount is relatively large, the end point position of the second projected image 82 is moved to a position far away from the start point position by changing the display. In this case, it becomes difficult for the user U to recognize the first projected image 81. Therefore, in the second projected image update processing of the present embodiment, the distance change amount is limited and the end point position is gradually changed. The method of determining the update limit amount, which is a limit value of the distance change amount, is not particularly limited. The update limit amount may be, for example, an experimentally obtained value or a value that changes according to the current distance or the like.

In a case in which the distance change amount is equal to or less than the update limit amount, the determination in Step S180 is an affirmative determination, and the processing proceeds to Step S182. In Step S182, the display controller 56 displays the second projected image 82 in which the end point position is changed from the current end point position to the target end point position. In a case in which the processing of Step S182 ends, the second projected image update processing shown in FIG. 13 ends, and the processing returns to Step S110 of the image processing shown in FIG. 12. On the other hand, in a case in which the distance change amount exceeds the update limit amount, the determination in Step S180 is a negative determination, and the processing proceeds to Step S184.

In Step S184, the display controller 56 corrects the target end point position to a position according to the update limit amount. Specifically, the display controller 56 sets the target end point position to the target end point position in a case in which the distance change amount is set to the update limit amount.

In the next step S186, the display controller 56 displays the second projected image 82 in which the end point position is changed from the current end point position to the target end point position which is corrected in Step S184. In a case in which the processing of Step S186 ends, the second projected image update processing shown in FIG. 13 ends, and the processing returns to Step S110 of the image processing shown in FIG. 12.

In this way, according to the projected image update processing of the present embodiment, the second projected image 82 can be displayed to follow the change of the relative position between the AR glasses 10 (user U) and each of the target object 72A and the target object 72B while slightly delaying the change of the relative position so as not to be complicated.

By combining the first embodiment and the second embodiment, an aspect in which both the AR glasses 10 (user U) and the target object 72 may move.

Third Embodiment

In the present embodiment, as a modification example of the above-mentioned embodiment, an aspect in which the target object 72 is an exhibit in a museum or the like, and the processor 41 controls the display of the first projected image 81 indicating information related to the exhibit and the second projected image 82 will be described.

Figure 14:
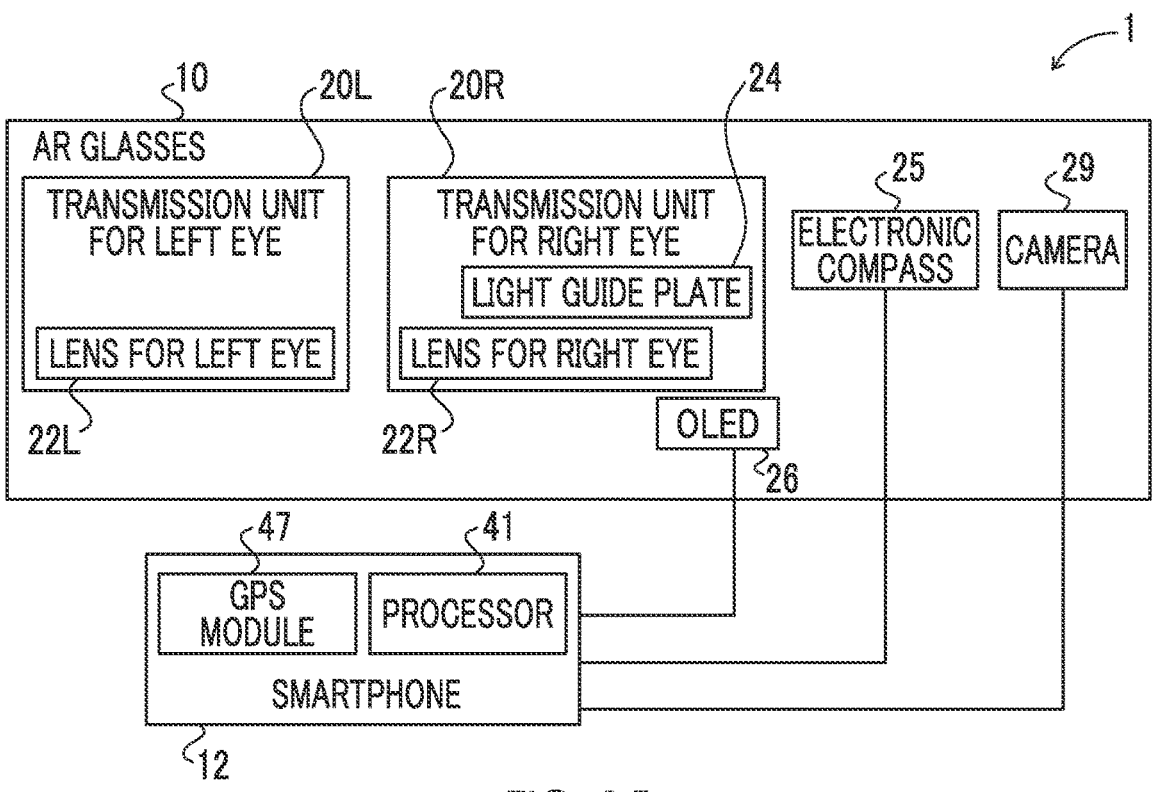
FIG. 14 is a configuration diagram showing an example of a configuration of a glasses-type information display device according to a third embodiment.

As shown in FIG. 14, the AR glasses 10 of the present embodiment further comprises a camera 29. The camera 29 is a camera that images a visual line direction of the user U. The captured image captured by the camera 29 is output to the smartphone 12.

Figure 15:
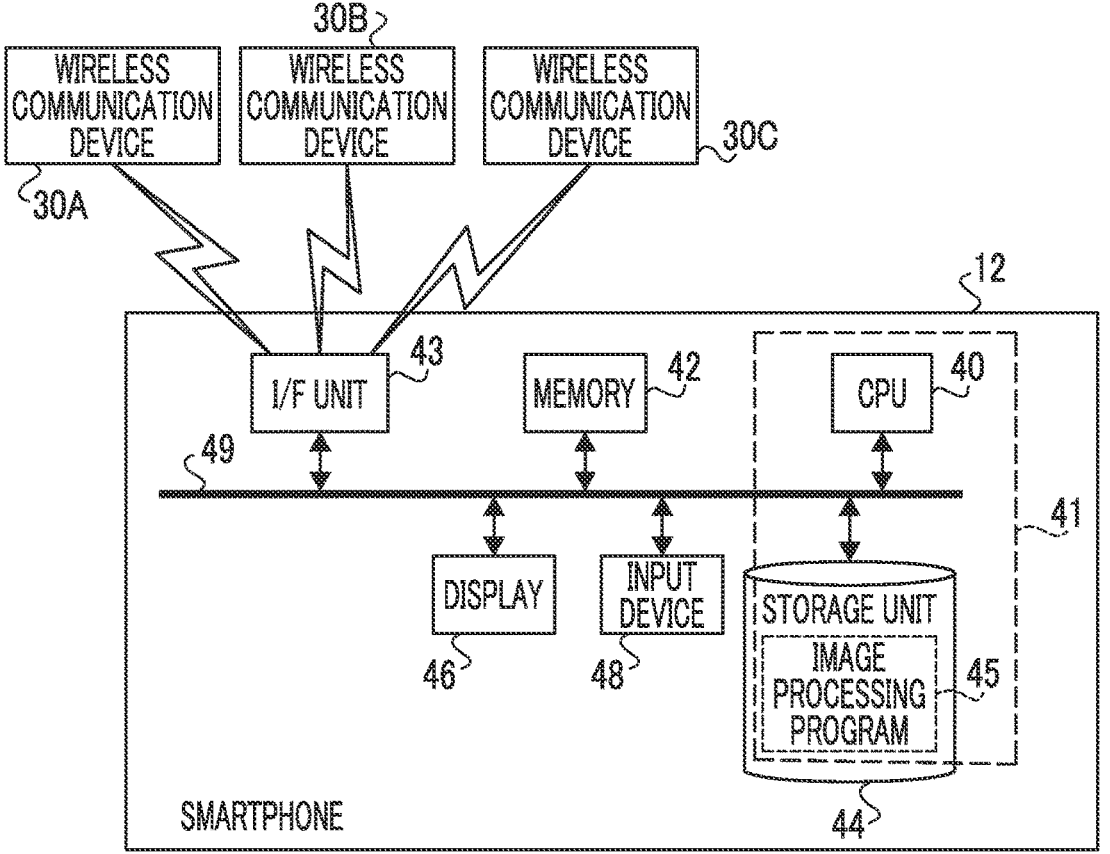
FIG. 15 is a block diagram showing an example of a hardware configuration of a smartphone according to the third embodiment.

In addition, as shown in FIG. 15, the OF unit 43 of the smartphone 12 of the present embodiment is different in that it wirelessly communicates with the wireless communication devices 30A to 30C. Each of the wireless communication devices 30A to 30C wirelessly transmits position information of the own device, information indicating the position of the target object 72, and the content of the target object 72, specifically, information to be displayed as the first projected image 81. In a case in which the wireless communication devices 30A to 30C are collectively referred to, the wireless communication devices 30A to 30C are simply referred to as the wireless communication device 30.

The number of the wireless communication devices 30 is not limited and may be provided according to the installation environment of the target object 72. For example, in a case in which the target object 72 is installed on each floor of the building, the wireless communication device 30 may be provided on each floor. In addition, the wireless communication device 30 may be provided for each room in which the target object 72 is installed.

The processor 41 of the present embodiment derives the position of the AR glasses 10 (user U) from the position information of each wireless communication device 30 received from the wireless communication device 30. In addition, the direction of the AR glasses 10 is derived from the electronic compass 25 of the AR glasses 10.

Figure 16:
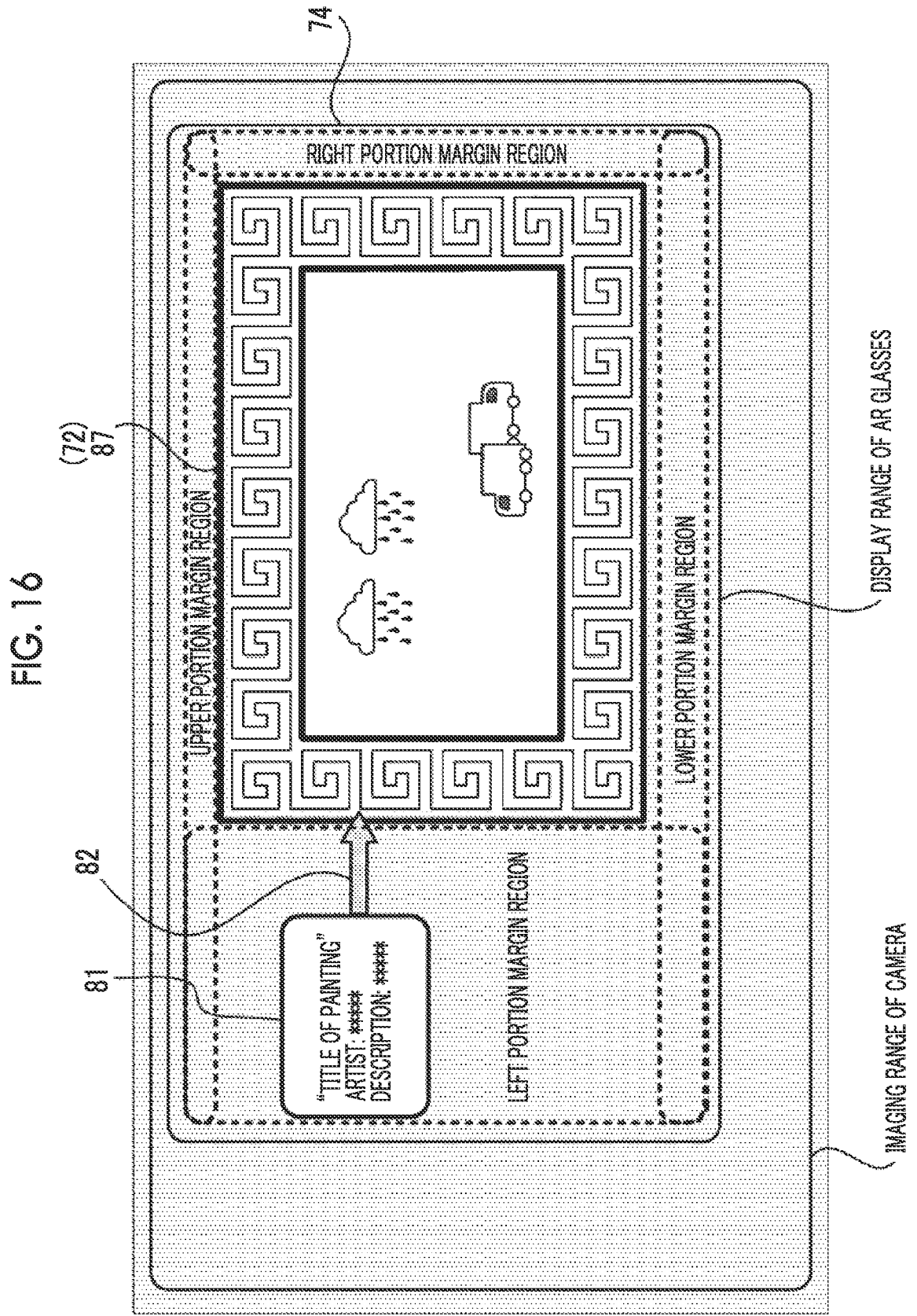
FIG. 16 is a diagram for explaining the third embodiment.

In addition, the processor 41 acquires a correspondence relationship between the target object 72 and a display range of the AR glasses 10 from the captured image obtained by the camera 29 of the AR glasses 10. FIG. 16 shows a relationship between an imaging range of the camera 29, that is, a range appearing in the captured image, and the display range of the AR glasses 10. The display range of the AR glasses 10 shown in FIG. 16 corresponds to the visually-recognized image 74 of the user U.

As an example, the processor 41 of the present embodiment derives the position of the target object 72 in the captured image by performing image analysis on the captured image obtained by the camera 29. In addition, the processor 41 derives the position of the target object 72 (virtual target object image 86) within the display range of the AR glasses 10 based on the correspondence relationship between the imaging range of the camera 29 and the display range of the AR glasses 10.

Further, the processor 41 detects an upper portion margin region, a right portion margin region, a lower portion margin region, and a left portion margin region with respect to the region around the target object 72, and displays the first projected image 81 and the second projected image 82 in the region having the largest margin.

As described above, after the display of the first projected image 81 is started, the processor 41 does not change the display position of the first projected image 81 even if the relative position relationship between the AR glasses 10 and the second projected image 82 changes as the user U moves the face up, down, left, and right. On the other hand, the processor 41 changes the display of the second projected image 82 following the change of the relative position between the AR glasses 10 and the target object 72. In a case in which the second projected image 82 is superimposed on the target object 72 by changing the display in response to the following, the second projected image 82 may not be displayed.

In addition, in a case in which the margin region is narrow and the first projected image 81 and the target object 72 are superimposed on each other, by reducing the brightness of the first projected image 81 and increasing the transmittance, it may be suppressed that the target object 72 is not visually recognized due to the first projected image 81.

In this way, by deriving the position of the target object 72 using the captured image captured by the camera 29 in the visual field direction of the user U, it is possible to obtain the position information of the target object 72 with higher accuracy. In addition, the display position of the first projected image 81 can be disposed at an appropriate position with respect to the display position of the target object 72 (virtual target object image 86).

In addition, with respect to a change in the relative position between the target object 72 (virtual target object image 86) and the AR glasses 10 (user U), in a case in which the target object 72 exists outside the visual field range of the user U, the change amount may be derived using the position of the AR glasses 10 by the GPS module 47, and in a case in which the target object 72 exists outside the visual field range of the user U, the change amount may be derived from the captured image captured by the camera 29.

As described above, according to each of the above-mentioned embodiments, it is possible to reduce the after-image and make it easier to visually recognize the first projected image 81 and the second projected image 82 for performing the navigation with respect to the target object 72.

In each of the above-mentioned embodiments, the virtual target object image 86 corresponding to the target object 72 is converted to a display position on the virtual projection surface 80, and based on the converted display position, the change of the relative position between the AR glasses 10 (user U) and the target object 72 is detected, but the method for detecting the change of the relative position is not limited to the present embodiment. For example, an aspect in which the change amount of the relative position between the display position of the first projected image 81 and the display position of the target object 72 or the virtual target object image 86 is detected in a case in which the change amount of the display position of the first projected image 81 is set to zero may be used. In this case, for example, an aspect in which the display position of the first projected image 81 is converted to the position of the real space 70, and a relative change between the position of the first projected image 81 in the real space 70 and the position of the target object 72 is detected may be used.

In each of the above-mentioned embodiments, the aspect in which the change amount of the display position of the first projected image 81 is set to zero has been described, but the change amount of the display position may not be zero. For example, the change amount of the first projected image 81 may be set to be smaller than the amount in which the change of the display position of the first projected image 81 can be recognized by the user U. In this case, for example, the amount that can be recognized by the user U may be calculated using the method described in WO2020/170945A.

In addition, as described above, the method of displaying the second projected image 82 so that the user U can visually recognize the relation between the target object 72 and the second projected image 82 is not limited to an aspect in which the first projected image 81 and the target object 72 are displayed to be connected as described above. For example, the first projected image 81 is displayed such that it has an outer frame having a star shape, is yellow, and is turned on and off at a cycle of $\frac{1}{10}$ second. In addition, the second projected image 82 is displayed as an outer frame surrounding the target object 72 (virtual target object image 86), and is displayed such that it has the outer frame having a large star shape, is yellow, and is turned on and off at a cycle of $\frac{1}{100}$ second. In this way, since the first projected image 81 and the second projected image 82 have a common shape, a common color, and a common cycle at which the first projected image 81 and the second projected image 82 are turned on and off, the user U can notice the relation between the target object 72 (virtual target object image 86) and the first projected image 81.

A shape of the glasses-type information display device is not limited to a general shape of glasses, an application, or a wearing portion. In addition, the glasses-type information display device may be a monocular type or a compound eye type, and the aspect in which the projected image is visually recognized with one eye has been described in the above-mentioned embodiment, but the projected image may be visually recognized with both eyes. A shape in which the left and right sides are connected like goggles may be used. In addition, it is not limited to devices worn on a human head, like a so-called head-mounted display (for example, if a robot with the appearance of a dog simulates a function of a human, and the function of human eyes is achieved by a camera in the robot's knee, then the control device according to the embodiment of the present disclosure is mounted on the knee). Such a control device is also included in the technique of the present disclosure.

In addition, the AR glasses 10 may comprise some or all of the functions of the processor 41 of the above-mentioned embodiment, or a device other than the glasses-type information display device 1 may comprise the functions.

In addition, the following various processors can be used in the above-mentioned embodiment as the hardware structures of processing units, which perform various types of processing, such as the first acquisition unit 50, the second acquisition unit 52, the position information derivation unit 54, and the display controller 56. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, as in the above-mentioned embodiment, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the image processing program 45 is stored (installed) in the storage unit 44 in advance has been described in each above-mentioned embodiment, but the present disclosure is not limited thereto. The image processing program 45 may be provided in a form where the image processing program 45 is recorded in recording mediums, such as a compact disc read only memory (CD-ROM), a digital versatile disc read only memory (DVD-ROM), and a universal serial bus (USB) memory. In addition, the image processing program 45 may be downloaded from an external device through a network.

In regard to the embodiment described above, the following supplementary notes will be further disclosed.

Supplementary Note 1

A processor configured to display a first display image that displays information related to an object existing in a real space and a second display image on a transmissive display device, change a display position of the second display image based on a change of a relative position between the display device and the object, and perform a control to make a change amount of a display position of the first display image smaller than a change amount of the display position of the second display image.

Supplementary Note 2

The processor according to Supplementary Note 1, in which the processor performs a control to display the second display image to follow the change of the relative position.

Supplementary Note 3

The processor according to Supplementary Note 2, in which the processor performs a control to make the change amount of the display position of the first display image smaller than an amount that a user of the display device is capable of recognizing a change of the display position of the first display image while the display position of the second display image is changed following the change of the relative position.

Supplementary Note 4

The processor according to any one of Supplementary Notes 1 to 3, in which the processor performs a control to set the change amount of the display position of the first display image to zero.

Supplementary Note 5

The processor according to any one of Supplementary Notes 1 to 4, in which in a case in which a position where the object exists is outside a range that is capable of being displayed by the display device, the processor performs a control not to display the first display image.

Supplementary Note 6

The processor according to any one of Supplementary Notes 1 to 5, in which the processor performs a control to display the second display image such that the user is capable of visually recognizing a relation between the object and the first display image, or the user is capable of visually recognizing a relation between a virtual object image corresponding to the object and the first display image in a display region in which the first display image is displayed.

Supplementary Note 7

The processor according to Supplementary Note 6, in which the control of displaying the second display image is a control of displaying the object and the first display image to be connected, or a control of displaying the virtual object image and the first display image to be connected.

Supplementary Note 8

The processor according to any one of Supplementary Notes 1 to 7, in which a position of the display device changes in the real space.

Supplementary Note 9

The processor according to any one of Supplementary Notes 1 to 8, in which a position of the object changes in the real space.

Supplementary Note 10

An image processing device comprising at least one processor, in which the processor displays a first display image that displays information related to an object existing in a real space and a second display image on a transmissive display device, changes a display position of the second display image based on a change of a relative position between the display device and the object, and performs a control to make a change amount of a display position of the first display image smaller than a change amount of the display position of the second display image.

Supplementary Note 11

An image processing device that is a control device that performs a control to display a first display image and a second display image in a display region of a transmissive display device, the image processing device comprising at least a processor, in which the processor converts a position of the first display image to a position in a real space, detects a relative change between the position of the first display image in the real space after the conversion and a position of an object, performs a control to display the first display image in the display region while a display position is fixed regardless of the relative change, and performs a control to display the second display image by changing the display position based on the relative change.

Supplementary Note 12

A glasses-type information display device comprising a transmissive display device, and the processor according to any one of Supplementary Notes 1 to 9.

Supplementary Note 13

An image processing method executed by a processor, comprising displaying a first display image that displays information related to an object existing in a real space and a second display image on a transmissive display device, changing a display position of the second display image based on a change of a relative position between the display device and the object, and performing a control to make a change amount of a display position of the first display image smaller than a change amount of the display position of the second display image.

Supplementary Note 14

An image processing program for causing a processor to execute a process comprising displaying a first display image that displays information related to an object existing in a real space and a second display image on a transmissive display device, changing a display position of the second display image based on a change of a relative position between the display device and the object, and performing a control to make a change amount of a display position of the first display image smaller than a change amount of the display position of the second display image.

What is claimed is:

1. A processor configured to:
display a first display image that displays information related to an object existing in a real space and a second display image on a transmissive display device;
change a display position of the second display image based on a change of a relative position between the display device and the object;
perform a control to make a change amount of a display position of the first display image smaller than a change amount of the display position of the second display image;
vary a display form of the second display image based on a distance to the object, in a case in which a position at which the object exists is outside a range that is capable of being displayed by the display device; and
wherein the processor is configured to perform a control to display the second display image such that the user is capable of visually recognizing a relation between the object and the first display image, or the user is capable of visually recognizing a relation between a virtual object image corresponding to the object and the first display image in a display region in which the first display image is displayed.

2. The processor according to claim 1,
wherein the processor is configured to perform a control to display the second display image to follow the change of the relative position.

3. The processor according to claim 2,
wherein the processor is configured to perform a control to make the change amount of the display position of the first display image smaller than an amount that a user of the display device is capable of recognizing a change of the display position of the first display image, while the display position of the second display image is changed following the change of the relative position.

4. The processor according to claim 3,
wherein the processor is configured to perform a control to set the change amount of the display position of the first display image to zero.

5. The processor according to claim 4,
wherein the processor is configured to perform a control not to display the first display image, in a case in which a position where the object exists is outside a range that is capable of being displayed by the display device.

6. The processor according to claim 1,
wherein the control of displaying the second display image is a control of displaying the object and the first display image to be connected, or a control of displaying the virtual object image and the first display image to be connected.

7. The processor according to claim 6,
wherein a position of the display device changes in the real space.

8. The processor according to claim 7,
wherein a position of the object changes in the real space.

9. An image processing device that is a control device that performs a control to display a first display image and a second display image in a display region of a transmissive display device, the image processing device comprising:
at least a processor,
wherein the processor is configured to:
convert a position of the first display image to a position in a real space,
detect a relative change between the position of the first display image in the real space after the conversion and a position of an object,
perform a control to display the first display image in the display region while a display position is fixed regardless of the relative change,
perform a control to display the second display image by changing the display position based on the relative change;
vary a display form of the second display image based on a distance to the object, in a case in which a position at which the object exists is outside a range that is capable of being displayed by the display device; and
wherein the processor is configured to perform a control to display the second display image such that the user is capable of visually recognizing a relation between the object and the first display image, or the user is capable of visually recognizing a relation between a virtual object image corresponding to the object and the first display image in a display region in which the first display image is displayed.

10. A glasses-type information display device comprising:
a transmissive display device; and
the processor according to claim 1.

11. An image processing method executed by a processor, comprising:
displaying a first display image that displays information related to an object existing in a real space and a second display image on a transmissive display device;
changing a display position of the second display image based on a change of a relative position between the display device and the object;
performing a control to make a change amount of a display position of the first display image smaller than a change amount of the display position of the second display image;
varying a display form of the second display image based on a distance to the object, in a case in which a position at which the object exists is outside a range that is capable of being displayed by the display device; and
wherein the processor is configured to perform a control to display the second display image such that the user is capable of visually recognizing a relation between the object and the first display image, or the user is capable of visually recognizing a relation between a virtual object image corresponding to the object and the first display image in a display region in which the first display image is displayed.

12. A non-transitory storage medium storing an image processing program for causing a processor to execute a process comprising:

displaying a first display image that displays information related to an object existing in a real space and a second display image on a transmissive display device;

changing a display position of the second display image based on a change of a relative position between the display device and the object;

performing a control to make a change amount of a display position of the first display image smaller than a change amount of the display position of the second display image;

varying a display form of the second display image based on a distance to the object, in a case in which a position at which the object exists is outside a range that is capable of being displayed by the display device; and wherein the processor is configured to perform a control to display the second display image such that the user is capable of visually recognizing a relation between the object and the first display image, or the user is capable of visually recognizing a relation between a virtual object image corresponding to the object and the first display image in a display region in which the first display image is displayed.

\* \* \* \* \*